(No Model.)

H. C. F. STORMER.
INHALING APPARATUS.

No. 391,564. Patented Oct. 23, 1888.

WITNESSES:
Fred. G. Dieterich,
Amos W. Hart.

INVENTOR,
H. C. F. Störmer.
BY Munn & Co.
ATTORNEYS.

UNITED STATES PATENT OFFICE.

HENRIK CHRISTIAN FREDRIK STORMER, OF CHRISTIANIA, NORWAY.

INHALING APPARATUS.

SPECIFICATION forming part of Letters Patent No. 391,564, dated October 23, 1888.

Application filed July 5, 1888. Serial No. 279,024. (No model.) Patented in Sweden February 11, 1887, No. 1,127; in England February 15, 1887, No. 2,391; in Germany February 16, 1887, No. 40,619; in France February 23, 1887, No. 168,919; in Belgium February 24, 1887, No. 76,475, and in Norway May 18, 1887, No. 372.

*To all whom it may concern:*

Be it known that I, HENRIK CHRISTIAN FREDRIK STORMER, a subject of the King of Norway and Sweden, and a resident of Christiania, Norway, have invented a new and useful Improvement in Inhaling Apparatus, (for which I have received Letters Patent in the following countries: in Norway, dated May 18, 1887, No. 372; in Germany, dated February 16, 1887, No. 40,619; in England, dated February 15, 1887, No. 2,391; in Belgium, dated February 24, 1887, No. 76,475; in France, dated February 23, 1887, No. 168,919, and in Sweden, dated February 11, 1887, No. 1,127,) of which the following is a specification.

My invention is an improvement in that class of inhalers in which solutions of drugs or medicinal substances are sprayed into a tube and thence carried into the lungs by a current of air passed through said tube. The particles of solid substances thus inhaled are saturated with liquid and hence swollen to such a degree that they cannot enter the smallest canals or cavities of the lungs.

In carrying out my invention I employ the apparatus shown in accompanying drawings, in which—

Figure 1:
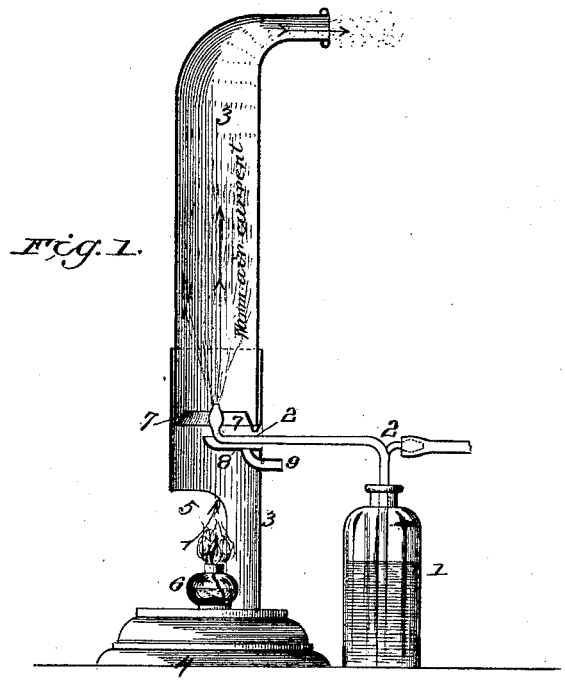
Figure 2:
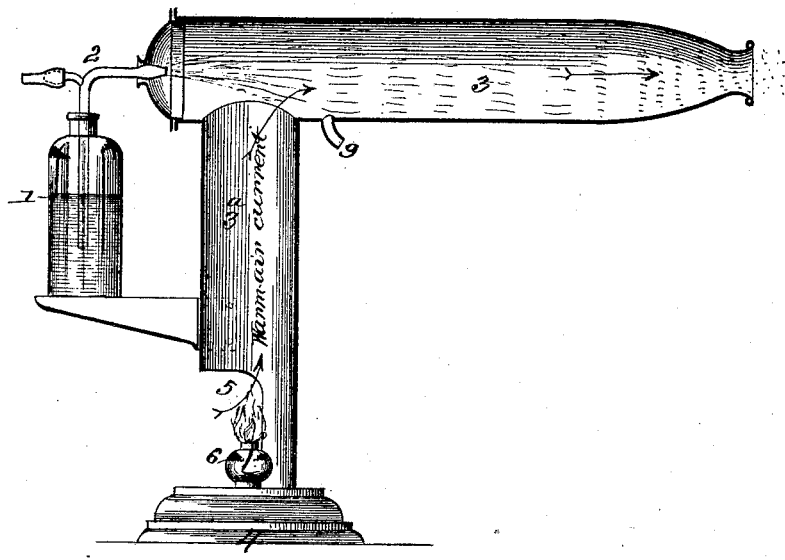

Figure 1 is mainly a vertical section of one form thereof, and Fig. 2 a similar view of a modification.

I will first describe the form illustrated in Fig. 1. In a bottle, 1, is placed a solution of the drug or medicinal substance to be inhaled. In this instance I will suppose it to contain an aqueous solution of silver nitrate in the proportions of one part of the nitrate to one thousand parts of water. This solution, by means of the atomizer 2, is introduced into the vertical tube 3 in the form of a very fine spray. The said tube 3 is supported on a suitable base, 4, and provided with a horizontal nozzle at its upper end. A portion of the spray-tube 3 is cut away to form an opening, 5, contiguous to the base 4. A lamp, 6, is placed in the cavity, as shown, for the purpose of inducing a heated current of air upward through the tube 3. (See arrows.) The heated air absorbs and evaporates most of the water sprayed into tube 3, thereby leaving a cloud of dry and minutely-subdivided particles of the solid substance (silver nitrate) to be conveyed onward (to the lungs of the patient) by the current of warm air. In this condition the said substance will enter the smallest cavities of the lungs, and thereby produce a curative effect otherwise impossible to attain by the same means. Such portion of the sprayed solution as is not thus taken up by the hot-air current collects on the sides of the spray-tube 3 and passes down into an annular gutter or trough, 7, formed in the lower portion of the spray-tube, and escapes therefrom into a subjacent collector, 8, provided with a small discharge-nozzle, 9.

In the form of inhaler shown in Fig. 2 the spray-tube 3 is horizontal instead of vertical, and supported on a vertical tube, $3^a$, having a portion cut away at 5 to accommodate a lamp, 6. The bottle 1 is supported on a bracket attached to tube $3^a$. The tube or nozzle 9, applied to its under side, serves to discharge the condensed surplus of the spray.

It is obvious the heated-air current may be produced by a stove or other source of heat in place of a lamp.

To indicate more plainly the novelty and scope of my invention, I will state that heated air has been forced through an atomizer for the purpose of spraying sulphuric ether, the object being to take up and carry along a maximum quantity of the latter; also, that it has been proposed to spray ether into a tube surrounded by hot water for the purpose of heating the spray, and thereby insuring the inhalation of the ether in a heated condition; but no current of heated air was employed, and hence both the operation and result were dissimilar from those incident to use of my apparatus.

What I claim is—

1. In an inhaling apparatus, the combination, with a spray-tube, 3, having an opening at the bottom, a lamp placed within it for causing a current of heated air to pass through the tube, a receptacle for a solution of a medicinal substance, and an atomizing attachment, 2, arranged as shown, whereby the solution is sprayed into the tube, where a current of hot air evaporates the liquid and conveys onward the dry and reduced particles of the medicinal substance, as specified.

2. In an inhaling apparatus, the combination, with the atomizer and vertical spray-tube, of the annular gutter arranged within the lower portion of the latter and the discharge-nozzle, as shown and described.

In testimony that I claim the foregoing as my invention I have signed my name, in presence of two witnesses, this 2d day of June, 1888.

HENRIK CHRISTIAN FREDRIK STORMER.

Witnesses:

OLAF HIORTH,

JOHAN FREDRIK ECKERSBERG.